(12) United States Patent
Keren

(10) Patent No.: US 6,625,305 B1
(45) Date of Patent: Sep. 23, 2003

(54) IMAGE DEMOSAICING METHOD

(75) Inventor: Daniel Keren, Kiryat-Tivon (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/375,178

(22) Filed: Aug. 16, 1999

(51) Int. Cl.[7] .......................... H04N 3/15; H04N 5/335; G06K 9/00
(52) U.S. Cl. .................. 382/162; 348/222.1; 348/280; 358/514; 358/525; 358/483
(58) Field of Search ................................ 382/167, 162, 382/112; 348/222.1, 280; 358/1.9, 504, 483, 513, 514, 518, 521, 525, 532

(56) References Cited

U.S. PATENT DOCUMENTS

| | | | |
|---|---|---|---|
| 4,630,307 A | | 12/1986 | Cok |
| 4,910,694 A | * | 3/1990 | Walther ....................... 348/246 |
| 5,373,322 A | | 12/1994 | Laroche et al. |
| 5,475,769 A | * | 12/1995 | Wober et al. ................. 382/167 |
| 5,838,818 A | * | 11/1998 | Herley ......................... 382/166 |
| 6,359,617 B1 | * | 3/2002 | Xiong ........................... 345/848 |
| 6,404,918 B1 | * | 6/2002 | Hel-or et al. ................ 382/167 |
| 6,434,265 B1 | * | 8/2002 | Xiong et al. ................. 382/154 |
| 6,530,010 B1 | * | 3/2003 | Hung et al. ..................... 712/1 |

OTHER PUBLICATIONS

Daniel Keren, et al.; "Restoring Subsampled Color Images"; 1999; pp. 197–202.

Ping Wah Wong, et al.; "Image Processing Considerations for Digital Photography"; Feb. 23, 1997; pp. 280–285.

D. P. Koester, et al.; "A Parallel Gauss–Seidel Algorithm for Sparse Power System Matrices"; Nov. 14, 1994; pp. 184–193.

\* cited by examiner

*Primary Examiner*—Bhavesh M. Mehta
*Assistant Examiner*—Christopher Sukhaphadhana

(57) ABSTRACT

A method for operating a data processing system to generate a second image from a first image having partially sampled color values at each pixel. The first image includes a two-dimensional array of pixel values, each of the pixel values corresponding to the light intensity in one of a plurality of spectral bands at a location in the first image. The second image includes a second two-dimensional array of color vectors. Each color vector has a light intensity value for each of the spectral bands. There is one such vector corresponding to each location having a pixel value in the first image. One component of the vector is equal to the pixel value in the first image at that location. The present invention computes the missing color components at each location. The method begins by providing an estimate for each component that is not equal to one of the pixel values from the first image for each vector. An updated estimate for each of the estimates is then generated by optimizing a weighted sum of first and second functions. The first function measures the degree of roughness of the second image, and the second function measures the degree to which the vectors change direction between neighboring locations in the second image.

3 Claims, 1 Drawing Sheet

IMAGE DEMOSAICING METHOD

FIELD OF THE INVENTION

The present invention relates to digital cameras, and more particularly, to an improved method for converting data from a camera sensor to a color image.

BACKGROUND OF THE INVENTION

A digital color image usually consists of an array of pixel values representing the intensity of the image at each point on a regular grid. Typically, three colors are used to generate the image. At each point on the grid the intensity of each of these colors is specified, thereby specifying both the intensity and color of the image at that grid point.

Conventional color photography records the relevant image data by utilizing three overlapping color sensing layers having sensitivities in different regions of the spectrum (usually red, green, and blue). Digital cameras, in contrast, typically utilize one array of sensors in a single "layer".

When only one sensor array is used to detect color images, only one color may be detected at any given sensor location. As a result, these sensors do not produce a color image in the traditional sense, but rather a collection of individual color samples, which depend upon the assignment of color filters to individual sensors. This assignment is referred to as the color filter array (CFA) or the color mosaic pattern. To produce a true color image, with a full set of color samples (usually red, green and blue) at each sampling location, a substantial amount of computation is required to estimate the missing information, since only a single color was originally sensed at each location in the array. This operation is typically referred to as "demosaicing".

To generate the missing information, information from neighboring pixels in the image sensor must be used. A number of algorithms have been put forward in an attempt to provide the missing information while minimizing artifacts resulting from the estimation process. The simplest algorithms interpolate the sensor data from like color sensors to provide the missing information. These algorithms treat the red sensors as being independent from the green sensors, and so on. To provide a red value at a given location, the values measured by the red sensors in the region of that location are interpolated. This approach requires that the image be low-pass filtered. Such filtering reduces the image resolution below the pixel resolution of the underlying sensor array. This lost resolution cannot be recovered.

In addition, systems that treat the color sensors independently can generate color artifacts in some images. These artifacts express themselves as streaks of false colors in the restored image, and are especially apparent around boundaries between different objects in the image and in textured areas.

To avoid the loss in resolution discussed above, less aggressive optical low-pass filtering is used in some higher-end cameras. However, in such systems, the color sensors may no longer be treated as independent. For example, Wober, et al. (U.S. Pat. No. 5,475,769) describe a method for generating the missing color information by computing a weighted average of the pixel values in the neighborhood of the pixel whose missing color information is being computed. This method weights values from all of the color sensors, not just the color being reconstructed. However, even this approach leaves much to be desired since it utilizes one set of weights for all images, and hence, there are always images in which unwanted artifacts are generated.

Broadly, it is the object of the present invention to provide an improved image processing method for converting data from a pixel array having non-overlapping sensors to a fully sampled digital image.

It is a further object of the present invention to provide a conversion method that does not generate the color artifacts discussed above.

These and other objects of the present invention will become apparent to those skilled in the art from the following detailed description of the invention and the accompanying drawings.

SUMMARY OF THE INVENTION

The present invention is a method for operating a data processing system to generate a second image from a first image having partially sampled color values at each pixel. The first image includes a two-dimensional array of pixel values, each of the pixel values corresponding to the light intensity in one of a plurality of spectral bands at a location in the first image. The second image includes a second two-dimensional array of color vectors. Each color vector has a light intensity value for each of the spectral bands. There is one such vector corresponding to each location having a pixel value in the first image. One component of the vector is equal to the pixel value in the first image at that location. The present invention computes the missing color components at each location. The method begins by providing an estimate for each component that is not equal to one of the pixel values from the first image for each vector. An updated estimate for each of the estimates is then generated by optimizing a weighted sum of first and second functions. The first function measures the degree of roughness of the second image, and the second function measures the degree to which the vectors change direction between neighboring locations in the second image.

DETAILED DESCRIPTION OF THE INVENTION

Figure 1:
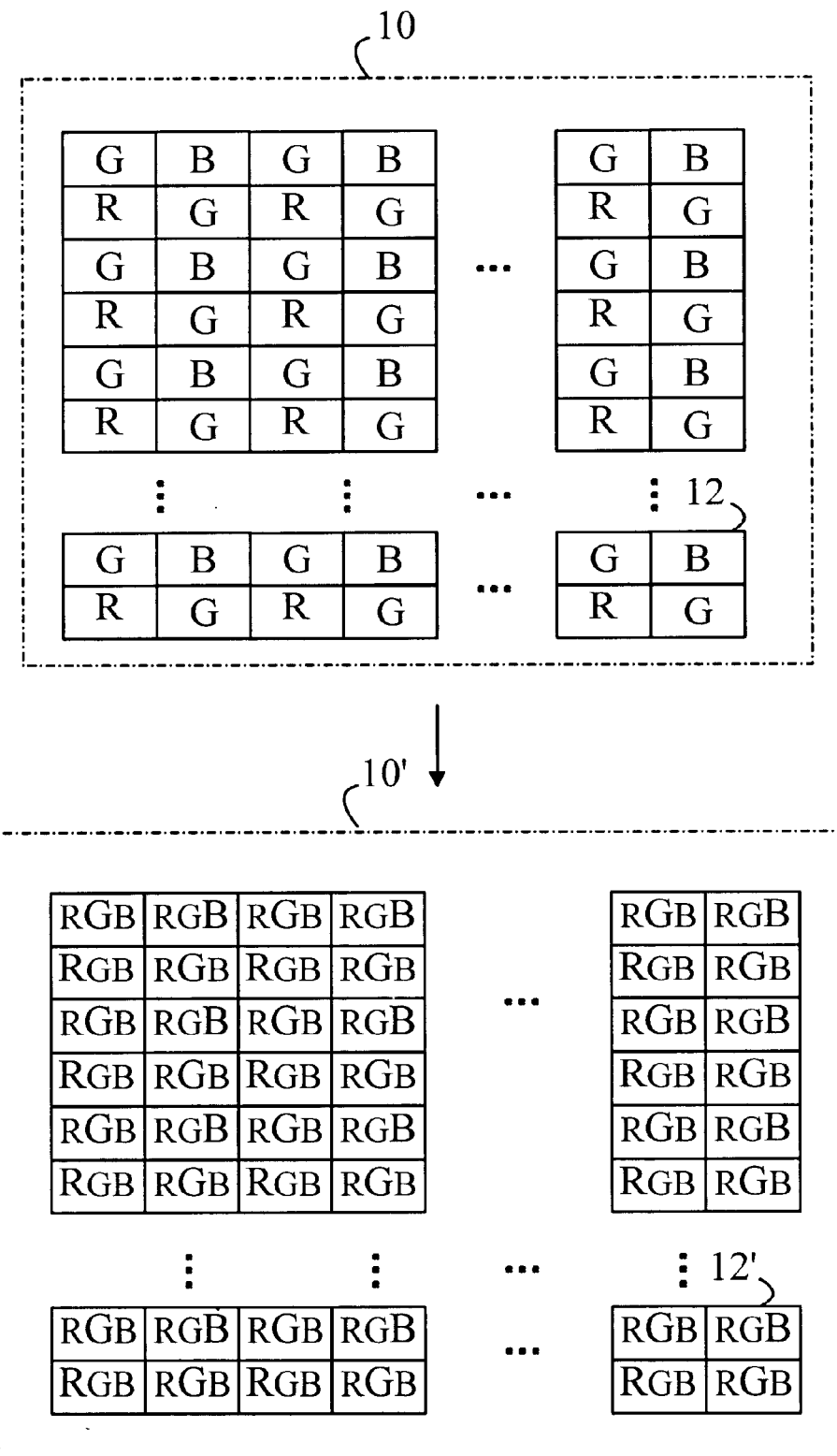
FIG. 1 illustrates the demosaicing problem as applied to a typical image taken with an image sensor having a repeating 2×2 pattern.

The method of the present invention may be applied to any color-sampling device; however, to simplify the following discussion, the method of the present invention will be explained in terms of an image sensor having a sensor pattern that is constructed by repeating a kernel of sensing elements. For example, one common image sensor array is based on the Bayer pattern which is generated by repeating a 2×2 sensor array kernel having two green sensors, one red sensor, and one blue sensor. This pattern is shown in FIG. 1 at 10. The kernel is shown at 12.

The present invention converts the data from such an array into an augmented array shown at 10' in which each pixel has intensity values representing each of three colors. The missing colors are shown in a smaller typeface in the figure. The individual sensor locations are assigned an address of the form (n,m), where n is the row number and m is the column number in which the sensor is located.

There are an infinite number of patterns 10' that satisfy the constraint that the measured values are as shown in 10. Hence, some additional constraints must be applied in generating the sensor values. The present invention utilizes two constraints in determining the missing color values. The first constraint is based on the observation that most images of interest to human observers are locally smooth. Hence, this constraint penalizes choices for the unknown color values that lead to abrupt changes in intensity in the image. The constraint utilizes a measure of the roughness of the image. For example, the function $$\iint (R_x^2 + R_y^2 + G_x^2 + G_y^2 + B_x^2 + B_y^2) dx dy \quad (1)$$

where, $R_x$ denotes the derivative of R with respect to x, etc., is a measure of the roughness of the image over the region of integration. Here R, B, G are the red, green, and blue color channels of the image. In the preferred embodiment of the present invention, the discrete analog of Eq. (1) is used to measure the roughness of the image. The roughness is measured over a 2 pixel range about the point being computing. In the preferred embodiment of the present invention, a function, denoted by Rough is defined as follows:

Rough$(n,m)=(r(n+1,m)-r(n-1,m))^2+(r(n,m+1)-r(n,m-1))^2+(g(n+1,m)-g(n-1,m))^2+(g(n,m+1)-g(n,m-1))^2+(b(n+1,m)-b(n-1,m))^2+(b(n,m+1)-b(n,m-1))^2$ The second constraint is based on the observation that most images of interest are locally smooth in color as well. Hence, this constraint penalizes choices for unknown color values that lead to abrupt changes in color. This constraint is implemented by defining a function that measures the degree to which adjacent pixels have color vectors (R, G, B) that have similar directions in color space. This function will be referred to as the Color Compatibility Function (CCF).

Formally, the CCF is defined as follows. For each pixel (viewed as a color vector), compute its vector product with all its neighbors; this gives 8 vectors. The CCF function is the sum of the squared norms of all these vectors. The CCF function at pixel (n,m) is given by:

CCF$(n,m)=\|r(n,m),g(n,m),b(n,m))X(r(n-1,m-1),$ $g(n-1,m<1),b(n-1,m-1))\|^2+$ $\|(r(n,m),g(n,m),b(n,m))X(r(n,m-1),$ $g(n,m-1),b(n,m-1))\|^2+$ $\|(r(n,m),g(n,m),b(n,m))X(r(n+1,m-1),$ $g(n+1,m-1),b(n+1,m-1))\|^2+$ $\|(r(n,m),g(n,m),b(n,m))X(r(n-1,m),$ $g(n-1,m),b(n-1,m))\|^2+$ $\|(r(n,m),g(n,m),b(n,m))X(r(n+1,m),$ $g(n+1,m),b(n+1,m))\|^2+$ $\|(r(n,m),g(n,m),b(n,m))X(r(n+1,m+1),$ $g(n-1,m+1),b(n-1,m+1))\|^2+$ $\|(r(n,m),g(n,m),b(n,m))X(r(n,m+1),$ $g(n,m+1),b(n,m+1))\|^2+$ $\|(r(n,m),g(n,m),b(n,m))X(r(n+1,m+1),$ $g(n+1,m+1),b(n+1,m+1))\|^2$

Here, X denotes the vector product.

The missing color values are defined by finding the values that minimize a weighted sum of the Rough and CCF functions over the image. That is $$Q = \sum_{n,m} \text{Rough}(n,m) + \lambda \sum_{n,m} CCF(n,m) \quad (2)$$

where, $\lambda$ is a positive constant. In the preferred embodiment of the present invention, the missing color values are determined by utilizing the conventional Gauss-Seidel iterative method. It should be noted that only the color values that were not measured by the digital camera are updated. In practice, the process converges after 4 or 5 iterations. It has also been found experimentally that the final result is not a sensitive function of the value of $\lambda$ over some minimum value. In practice a $\lambda$ value of 1.0 provides satisfactory results.

The above examples have utilized particular functions for measuring the roughness of the image and the rate of change of the color vectors in each region. However, it will be obvious to those skilled in the art from the preceding discussion that other functions may be utilized.

The method of the present invention is preferably practiced on a general purpose digital computer. However, other computing platforms with or without specialized hardware may be utilized.

The above-described embodiments of the present invention utilize a procedure that searches for a minimum of a function consisting of a weighted sum of two functions, one measuring the roughness of the image and one measuring the rate of change of the color vectors across the image. However, other functional representations and a procedure that operates by maximizing analogous functions can also be utilized.

Various modifications to the present invention will become apparent to those skilled in the art from the foregoing description and accompanying drawings. Accordingly, the present invention is to be limited solely by the scope of the following claims.

What is claimed is:

1. A method for operating a data processing system to generate a second image from a first image, said first image comprising a two-dimensional array of pixel values, each of said pixel values corresponding to the light intensity in one of a plurality of spectral bands at a location in said first image, and said second image comprising a second two-dimensional array of color vectors, each of said vectors having a light intensity value for each of said spectral bands, there being one such vector corresponding to each location having a pixel value in said first image, one component of said vector being equal to said pixel value in said first image at that location, said method comprising the steps of:

providing an estimate for each component that is not equal to one of said pixel values from said first image for each vector; and generating an updated estimate for each of said estimates by optimizing a weighted sum of a first function that measures the degree of roughness of said second image and a second function that measures the degree to which said vectors change direction between neighboring locations in said second image.

2. The method of claim 1 wherein said step of generating an updated estimate comprises optimizing said weighted sum using a Gauss-Seidel iterative method.

3. The method of claim 1 wherein said second function comprises a sum of the magnitude of the vector product of each of said vectors adjacent to that vector in said second two-dimensional array.

* * * * *